(12) United States Patent
Endo

(10) Patent No.: US 6,711,139 B1
(45) Date of Patent: Mar. 23, 2004

(54) TRANSMITTING AND RECEIVING APPARATUS FOR SATELLITE COMMUNICATIONS

(75) Inventor: Shoji Endo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/546,215

(22) Filed: Apr. 10, 2000

(30) Foreign Application Priority Data

Apr. 9, 1999 (JP) .......................................... 11-103359

(51) Int. Cl.$^7$ .............................................. H04B 7/212
(52) U.S. Cl. ...................... 370/322; 370/348; 370/462
(58) Field of Search ................................ 370/216, 503, 370/384, 351, 352, 462, 461, 442, 443, 445, 447, 448, 444, 450, 468, 347, 344, 345, 322, 348; 375/220; 340/825.5, 825.08

(56) References Cited

U.S. PATENT DOCUMENTS

| | | | |
|---|---|---|---|
| 4,504,946 A | * | 3/1985 | Raychaudhuri .............. 370/95 |
| 4,594,706 A | * | 6/1986 | Kobayashi .................... 370/89 |
| 6,178,177 B1 | * | 1/2001 | Vautey ....................... 370/455 |

FOREIGN PATENT DOCUMENTS

| JP | A 58-215148 | 12/1983 |
|---|---|---|
| JP | A 59-154844 | 9/1984 |
| JP | A 62-299142 | 12/1987 |
| JP | 63-166329 | 7/1988 |
| JP | 4-45020 | 7/1992 |
| JP | A 6-350604 | 12/1994 |
| JP | 2526788 | 6/1996 |
| JP | 2810063 | 7/1998 |

* cited by examiner

Primary Examiner—Ajit Patel
Assistant Examiner—Steven Blount
(74) Attorney, Agent, or Firm—Young & Thompson

(57) ABSTRACT

A transmitting and receiving apparatus for satellite communications, whose sizes of signal processing and apparatus are not made to be large, and which can make the transmission delay minimum caused by retransmission and is easy to be carried and installed, is provided. The transmitting and receiving apparatus for satellite communications provides a transmitting data collision detector, a first random access controller and a second random access controller. When the transmitting data collision detector detects collision of a transmitting packet data signal "Sb" transmitted through the first random access controller and a transmitting packet data signal "Sd" transmitted through the second random access controller, the transmitting data collision detector outputs a collision detecting signal to the second random access controller. The second random access controller retransmits the transmitting packet data signal "Sd" by making the transmitting timing of the transmitting packet data signal "Sd" delay without waiting for reception of an arrival confirmation signal for the transmitted data from a hub station.

3 Claims, 2 Drawing Sheets

US 6,711,139 B1

TRANSMITTING AND RECEIVING APPARATUS FOR SATELLITE COMMUNICATIONS

BACKGROUND OF THE INVENTION

The present invention relates to a transmitting and receiving apparatus for satellite communications, which uses a random access processing for data transmission.

Description of the Related Art

In order to utilize a microwave band effectively, at a satellite communications system, a random access processing is used. For example, a very small aperture terminal (VSAT) system consists of a hub station, a plurality of VSATs, and a communications satellite. And a packet data communications is performed between the hub station and the plural VSATs via the communications satellite. In this case, the plural VSATs use the same frequency band, and a random access processing is adopted to perform retransmission in case that plural transmitting data collide, with this, the occupied bandwidth is not made to be large.

FIG. 1 is a block diagram showing a structure of a conventional transmitting and receiving apparatus for satellite communications. In FIG. 1, this transmitting and receiving apparatus for satellite communications is a VSAT. And this VSAT provides an antenna 11, such as a parabolic antenna, which radiates and receives radio waves by setting its elevation angle and bearing to the communication satellite, and a transmitter/receiver 12 that transmits a data to the hub station and receives a data from the hub station through the antenna 11. And further this transmitting and receiving apparatus for satellite communications provides a modulator-demodulator (MODEM) 13, which demodulates a signal from the transmitter/receiver 12 and modulates a transmitting data, and outputs the demodulated or modulated data, a random access controller 14 by which microwave radio transmission lines using for the data transmission to and from the hub station are utilized effectively, and a data interface 15 which outputs a received packet data signal "Se" and processes a transmitting packet data signal "Sf" inputted from an external terminal (not shown).

Next, an operation of the conventional transmitting and receiving apparatus for satellite communications is explained. In case that a signal is received, first, a radio wave from the hub station is received at the antenna 11. This signal received at the antenna 11 is demodulated at the MODEM 13 via the transmitter/receiver 12. This demodulated data is inputted to the random access controller 14. The random access controller 14 controls addresses of the demodulated data, when the demodulated data has an address for this transmitting and receiving apparatus for satellite communications, the random access controller 14 outputs the received data as the received packet data signal "Se" via the data interface 15 to the external terminal (not shown).

In case that a signal is transmitted, a transmitting packet data signal "Sf" from the external terminal (not shown) is inputted to the data interface 15. The transmitting packet data signal "Sf" is inputted to the random access controller 14 via the data interface 15. In case that plural transmitting data collide at the communications satellite and the transmitting data does not arrive at the hub station, and this transmitting and receiving apparatus for satellite communications can not receive an arrival confirmation signal for this own address from the hub station. In this case, a random access processing is performed at this random access controller 14 in order to retransmit the transmitting data. The transmitting packet data signal "Sf" from the random access controller 14 is modulated at the MODEM 13 and is radiated from the antenna 11 via the transmitter/receiver 12 as a radio wave.

At this type conventional transmitting and receiving apparatus for satellite communications, the data interface 15 has a physical interface such as the number of connectors and also performs a logical interface processing data with the external terminals. That is, the data interface 15 consists of a microprocessor unit (MPU) and a memory, in order that the data interface 15 needs a protocol processing function. In case that a generally used MPU is used, there is a limit to the number of the physical interfaces connecting to the external terminals depending on the throughput of the generally used MPU. As a result, the throughput must be increased by a parallel processing used plural MPUs and bus lines, and dual port memories. In this case, the number of the physical interfaces can be increased, however there is a problem that the size of the apparatus becomes large.

Furthermore, in case that a large number of physical interfaces is required at the same ground station site, that is, a large number of packet data signals are transmitted and received to and from the hub station, a plurality of the transmitting and receiving apparatuses for satellite communications shown in FIG. 1 must be provided. In this case, there are problems that the size of the facilities becomes large and the investment becomes large, further the large area for installing the apparatuses is required.

In order to solve these problems, for example, Japanese Patent No. 2810063 describes a satellite communications system, Japanese Patent Application Laid-Open No. SHO 63-166329 discloses a transmission line control system, Japanese Patent Publication No. HEI 4-45020 discloses a forced transmission stopping system, and Japanese Patent No. 2526788 describes a transmitting and receiving apparatus for satellite communications in a ground station.

However, at the satellite communications system of Japanese Patent No. 2810063, the transmission line control system of Japanese Patent Application Laid-Open No. SHO 63-166329, and the forced transmission stopping system of Japanese Patent Publication No. HEI 4-45020, the size of processing is too large and the processing can not be performed by the generally used MPU. And when a large number of packet data signals are transmitted, a large size of physical interfaces are required, therefore there is a problem that it is difficult to realize the operation by using the generally used MPU. As a result, there is, a problem that it is difficult to increase or decrease the number of apparatuses corresponding to the amount of the transmitting data, for applying to VSATs, which are required to be carried and installed easily. Furthermore, at the transmitting and receiving apparatus for satellite communications in a ground station described in Japanese Patent No. 2526788, the size of the circuits can be reduced, however, when plural transmitting packet data signals are transmitted at the same time, it takes long time to retransmit the discarded transmitting packet data signals, therefore there is a problem that the transmission delay becomes large.

SUMMARY OF THE INVENTION

It is therefore an object of the present invention to provide a transmitting and receiving apparatus for satellite communications, which can make the transmission delay caused by retransmission minimize without increasing the sizes of signal processing and apparatus, and further with which the degree of freedom for alteration of total construction of apparatuses corresponding to the amount of the transmission data can be obtained, and which can be easily carried and installed.

According to a first aspect of the present invention for achieving the object mentioned above, there is provided a transmitting and receiving apparatus for satellite communications, in which packet data are transmitted and received by a random access processing Said transmitting and receiving apparatus for satellite communications provides plural random access control means; for applying a random access processing to a transmitting data from each of external terminals, provided for each of said external terminals, a collision detecting means for detecting collision of plural transmitting data transmitted from said plural random access control means, when said plural transmitting data are transmitted at the same time, a selecting means for selecting one of said plural transmitting data from said plural, random access control means, a transmitting means for converting said transmitting data selected at said selecting means to a signal to be transmitted, and an antenna in which said signal to be transmitted from said transmitting means is radiated as a radio wave. And said plural random access control means retransmit said transmitting data not selected at said selecting means by making the transmitting timing of said transmitting data not selected at said selecting means delay when the collision of said plural transmitting data is detected at said collision detecting means.

According to a second aspect of the present invention in the first aspect, said plural random access control means retransmits said transmitting data not selected without waiting for reception of an arrival confirmation signal for the transmitted data from a hub station, in case that said transmitting data not selected is retransmitted.

According to a third aspect of the present invention in the first aspect, said antenna is used for both transmitting and receiving data. And said transmitting and receiving apparatus for satellite communications further provides a receiving means for converting said signal received at said antenna to received data to which a signal processing can be applied. And said selecting means supplies said received data from said receiving means to said plural random access control means, and said plural random access control means output only the received data corresponding to its own address to said corresponding external terminal.

According to the present invention, when said collision detecting means detects the collision of plural transmitting data from said plural random access control means, said random access control means retransmits said transmitting data not transmitted caused by the collision without waiting for the reception of an arrival confirmation signal for the transmitted data from a hub station. Therefore, the transmission delay caused by the retransmission can be made to be minimum. Moreover, said antenna and a transmitter/receiver are used as a common for plural external terminals, with this, the sizes of signal processing and apparatuses are not increased greatly. Consequently, the degree of freedom for the construction corresponding to the amount of the transmitting data can be increased and further the apparatuses can be easily carried and installed.

BRIEF DESCRIPTION OF THE DRAWINGS

The objects and features of the present invention will become more apparent from the consideration of the following detailed description taken on junction with the accompanying drawings in which.

DESCRIPTION OF THE PREFERRED EMBODIMENTS

Figure 1:
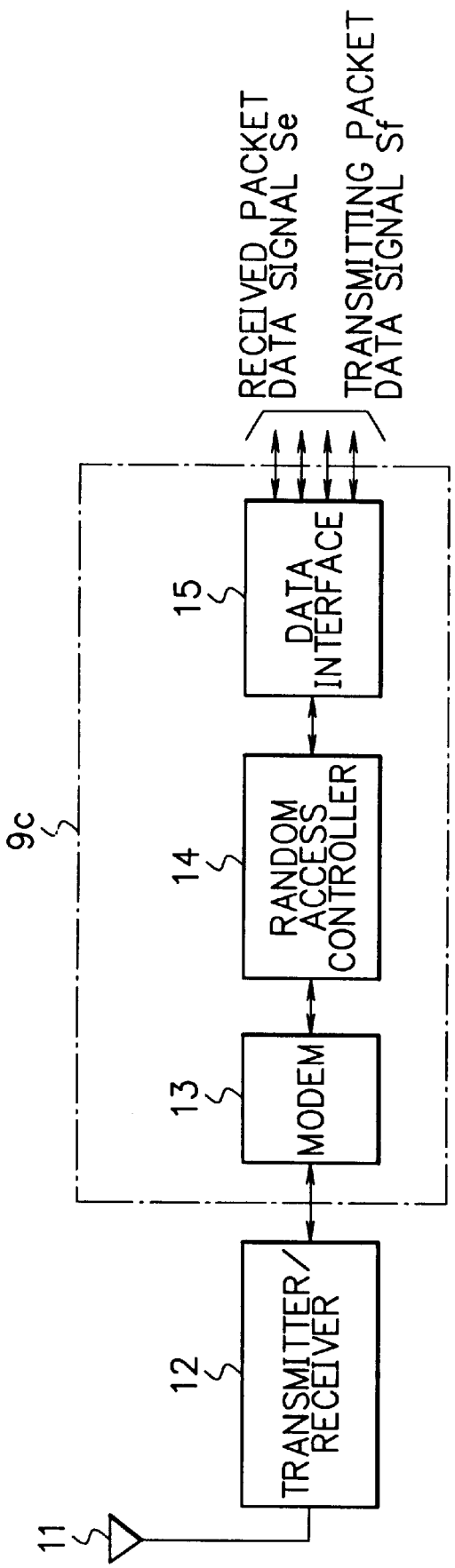
FIG. 1 is a block diagram showing a structure of a conventional transmitting and receiving apparatus for satellite communications.
Figure 2:
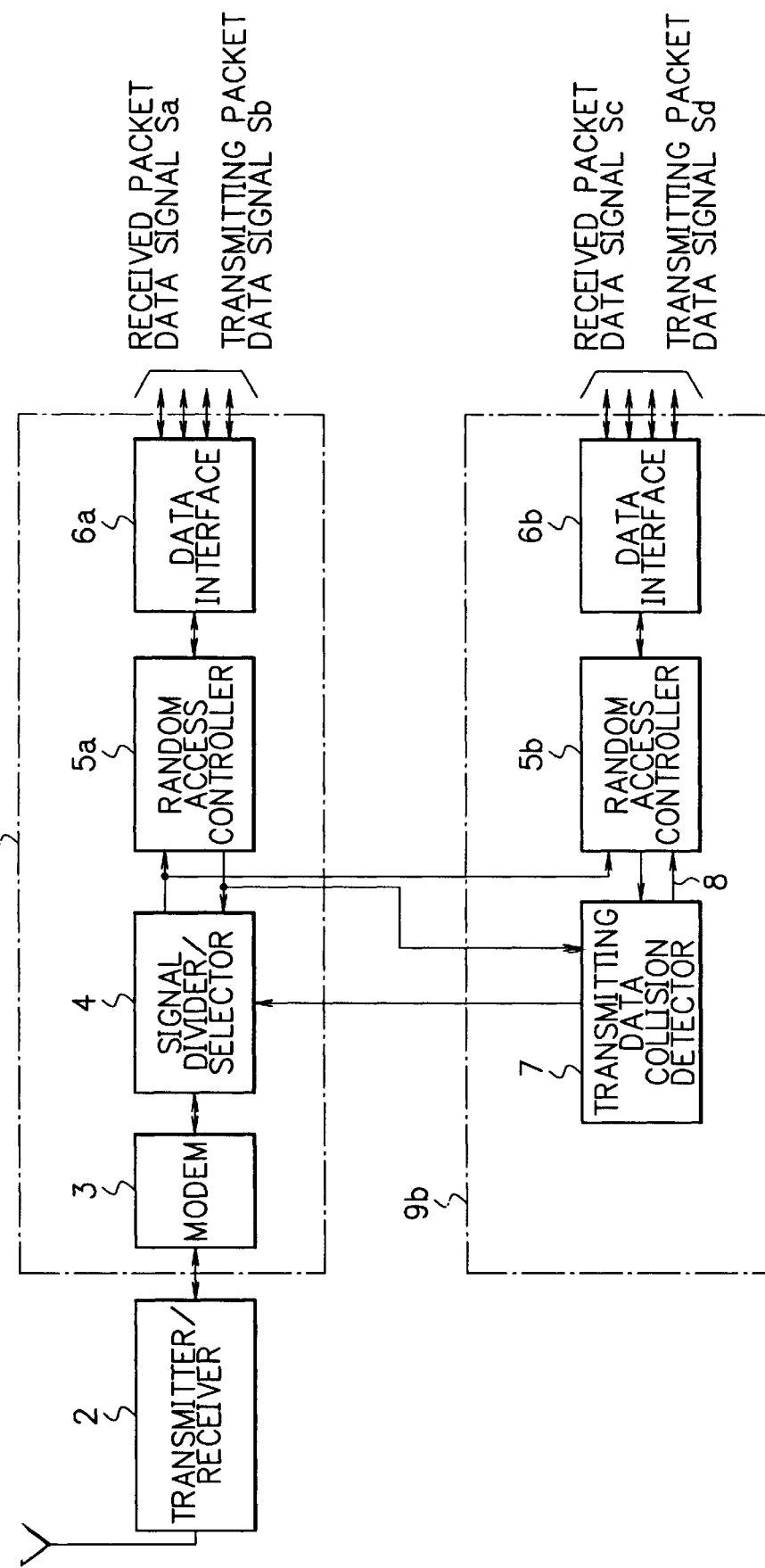
FIG. 2 is a block diagram showing a structure of a transmitting and receiving apparatus for satellite communications of the present invention.

Referring now to the drawing, an embodiment of the present invention is explained in detail. FIG. 2 is a block diagram showing a structure of a transmitting and receiving apparatus for satellite communications of the present invention. This transmitting and receiving apparatus for satellite communications is an example of the very small aperture terminal (VSAT). As shown in FIG. 2, this transmitting and receiving apparatus for satellite communications consists of an antenna 1, such as a parabolic antenna, which radiates and receives radio waves by setting its elevation angle and bearing to a communications satellite, a transmitter/receiver 2 that transmits data to a hub station and receives data from the hub station through the antenna 1, a basic instrument 9a, and an expanding instrument 9b.

The basic instrument 9a provides a modulator-demodulator (MODEM) 3, a signal divider/selector 4, a random access controller 5a, and a data interface 6a. The expanding instrument 9b provides a transmitting data collision detector 7, a random access controller 5b, and a data interface 6b. First, functions in the basic instrument 9a are explained. The MODEM 3 demodulates a signal received from the transmitter/receiver 2 and supplies the demodulated signal to the signal divider/selector 4, and also modulates a transmitting packet data signal "Sb" from the random access controller 5a or a transmitting packet data signal "Sd" from the random access controller 5b and outputs the modulated signal. The signal divider/selector 4 divides the demodulated signal from the MODEM 3 and supplies the divided signals to the random access controllers 5a and 5b, and also selects either the transmitting packet data signal "Sb" or "Sd" and outputs the selected signal to the MODEM 3. The random access controller 5a performs a random access control so that microwave radio transmission lines using for the data transmission to and from the hub station are utilized effectively. The data interface 6a provides an interface function to external terminals and processes the transmission data that are a received packet data signal "Sa" and the transmitting packet data signal "Sb".

Next, functions in the expanding instrument 9b are explained. The random access controller 5b is connected to the signal divider/selector 4 and performs a random access control so that microwave radio transmission lines using for the data transmission to and from the hub station are utilized effectively. When a collision detecting signal 8 from the transmitting data collision detector 7 is supplied to the random access controller 5b at the transmitting time, the random access controller 5b makes the transmitting timing of the transmitting data that is the transmitting packet data signal "Sd" delay. After this, when the transmitting data from the random access controller 5a becomes zero, after the time of two hops transmitting from the apparatus to the communications satellite, without waiting for the reception of the arrival confirmation signal for the transmitting data from the hub station, the transmitting packet data signal "Sd" is retransmitted immediately. The data interface 6b provides an interface function with external terminals and processes the transmission data that are a received packet data signal "Sc" and the transmitting packet data signal "Sd". The transmitting data collision detector 7 watches the transmitting timing of, the transmitting data that are the transmitting packet data signals "Sb" and "Sd" transmitted from the random access controllers 5a and 5b, and when the transmitting data collision detector 7 detects that the transmitting data are at the same timing, the collision detecting signal 8 is supplied to the random access controller 5b.

Next, an operation of the transmitting and receiving apparatus for satellite communications of the present invention is explained. In case of receiving signals, a radio wave from the hub station is received at the antenna 1. The signal received at the antenna 1 is demodulated at the MODEM 3 via the transmitter/receiver 2. The demodulated signal is divided into two at the signal divider/selector 4 and the divided, signals are supplied to the random access controllers 5a and 5b respectively. The random access controller 5a controls addresses of the demodulated data and the data interface 6a processes the demodulated data of its own address and outputs the received packet data signal "Sa" to the external terminal (not shown). And the random access controller 5b also controls addresses of the demodulated data, and the data interface 6b processes the demodulated data of its own address and outputs the received packet data signal "Sc" to the external terminal (not shown).

In case of transmitting signals, the transmitting packet data signals "Sb" and "Sd" are supplied to the data interfaces 6a and 6b respectively from the external terminals at the same time or shifted time. The transmitting packet data signal "Sb" is inputted to the random access controller 5a via the data interface 6a. The random access controller 5a performs a random access processing for re-transmitting, when plural transmitting data collide, at the communications satellite and the arrival confirmation signal for its own address from the hub station could not be received. The transmitting packet data signal "Sb" is supplied to the signal divider/selector 4 and the transmitting data collision detector 7.

And the transmitting packet data signal "Sd" is inputted to the random access controller 5b via the data interface 6b. The random access controller 5b performs a random access processing, when plural transmitting data collide at the communications satellite and the arrival confirmation signal for its own address from the hub station could not be received. The transmitting packet data signal "Sd" is supplied to the transmitting data collision detector 7.

At this time, when the transmitting packet data signals "Sb" and "Sd" from the external terminals are inputted to the data interfaces 6a and 6b, and the signals are transmitted from the random access controllers 5a and 5b at the same time, the collision detecting signal 8 is supplied to the random access controller 5b from the transmitting data collision detector 7. When the random access controller 5b receives the collision detecting signal 8, the random access controller 5b makes the transmitting timing of the transmitting packet data signal "Sd" delay, and after the transmitting data from the random access controller 5a stops, the random access controller 5b processes re-transmitting of the transmitting packet data signal "Sd" immediately.

Therefore, at the case that the transmitting packet data signals "Sb" and "Sd" from the external terminals are output from the random access controllers 5a and 5b at the same time respectively, the collision detecting signal 8 is outputted from the transmitting data collision detector 7. Consequently, the transmitting packet data signal "Sd" is discarded at the signal divider/selector 4 temporarily.

However, the random access controller 5b makes the transmitting timing of the transmitting packet data signal "Sd" delay and processes re-transmitting the transmitting packet data signal "Sd" immediately. Therefore, the transmitting packet data signal "Sd" is made to retransmit without waiting for the reception of the arrival confirmation signal to its own address from the hub station. In the embodiment, two transmitting packet data signals "Sb" and "Sd" are applied, but two or more transmitting packet data signals can be applied and the transmitting operation can be performed by the same processing, by installing additional expanding instruments 9b.

As mentioned above, at the embodiment, the received packet data signal is divided, and also one of the transmitting packet data signals is selected and transmitted, and the discarded transmitting packet data signal is retransmitted immediately by making the transmitting timing of the discarded transmitting packet data signal delay. With this structure, the transmission delay by re-transmitting is made to be minimum, and the physical interfaces not including the antenna 1 and the transmitter/receiver 2 can be realized by a simple structure using a generally used MPU. Furthermore, the antenna 1 and the transmitter/receiver 2 can be used as a common, therefore when the number of the physical interfaces to the external terminals is required to increase, plural apparatuses can be easily carried and installed.

As explained above, at the present invention, the antenna and the transmitter/receiver can be used as a common, and one of the plural transmitting data signals can be selected, at this time, the transmitting data signal discarded caused by the same time transmission is retransmitted immediately by making the transmitting timing delay. With this, the transmission delay caused by the retransmission can be made to be minimum, and the sizes of the signal processing and apparatus are not made to be large. Moreover, the degree of freedom for altering the size of apparatuses corresponding to the amount of the transmitting data can obtain, and the apparatuses can be carried and installed easily.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A satellite communication system with random access processing of packet data, comprising:

a first external terminal and an associated first random access controller that transmits packet data received from said first external terminal and that performs random access processing of the packet data when receipt of the packet data from the first random access controller is not confirmed;

a second external terminal and an associated second random access controller that transmits packet data received from said second external terminal and that performs random access processing of the packet data when receipt of the packet data from the second random access controller is not confirmed;

a selector connected to said first and second random access controllers for transmitting packet data received from said first and second random Access controllers;

a collision detector connected to said first and second random access controllers and to said selector for detecting a collision between packet data transmitted from said first and second random access controllers, wherein when said collision detector detects a collision between packet data transmitted from said first and second random access controllers, said collision detector informs said second random access controller and in response said second random access controller delays transmission of packet data from said second random access controller; and a transmitter and antenna for transmitting the packet data from said selector as a radio wave signal.

2. The system of claim 1, wherein said second random access controller transmits the packet data after the delay without waiting for confirmation of receipt of the transmitted packet data.

3. The system of claim 1, further comprising a receiver connected to said antenna and to said selector, and wherein said selector sends data received at said receiver to said first and second random access controllers.

* * * * *